May 9, 1933.  A. S. FITZ GERALD ET AL  1,907,531

SPEED REGULATOR

Filed March 20, 1931

Inventors:
Alan S. FitzGerald,
Charles J. Young,
by *Charles V. Muller*
Their Attorney.

Patented May 9, 1933

1,907,531

UNITED STATES PATENT OFFICE

ALAN S. FITZ GERALD, OF WYNNEWOOD, AND CHARLES J. YOUNG, OF ARDMORE, PENNSYLVANIA, ASSIGNORS TO GENERAL ELECTRIC COMPANY, A CORPORATION OF NEW YORK

SPEED REGULATOR

Application filed March 20, 1931. Serial No. 524,112.

Our invention relates to speed regulators and more particularly to speed regulators for the units of a multi-unit system which requires synchronism between its various units.

Our invention finds particular application to the rotatable elements of the transmitting and receiving stations of electrical picture transmission systems. The operation of such systems requires synchronism between a pair of corresponding rotating elements or units. As the distance between transmitting and receiving stations may be very great, it would be impractical to attain synchronism between these elements by the direct or indirect transmission of synchronizing forces or impulses between them. There is, therefore, a need for a readily reproducible self-contained speed regulating means which may be used in connection with such systems. Such a regulator may of course also be applied to many independent devices.

It is an object of our invention to provide a simple, inexpensive and self-contained speed regulator.

It is another object of our invention to provide an easily reproducible speed regulator which may be used in connection with rotating units which must be operated in synchronism.

Our invention will be better understood from the following description, taken in connection with the accompanying drawing, and its scope will be pointed out in the appended claims.

Figure 1:
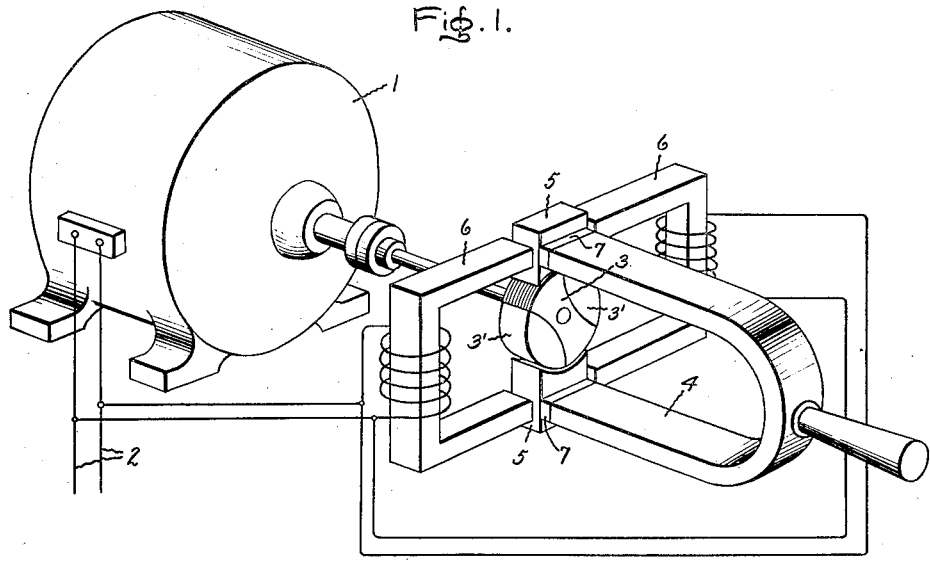
Figure 2:
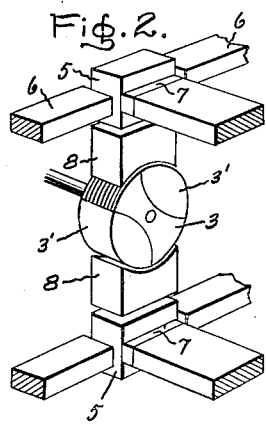

In the drawing, Fig. 1 illustrates a simple embodiment of our invention, while Fig. 2 represents a modification thereof.

Reference is now made to Fig. 1 of the accompanying drawing wherein we have shown an embodiment of our invention applied to an electric motor 1. This motor may be of any type and will be assumed in the following description to be a small fractional horse power direct current motor, such as is often used for operating facsimile machines. A suitable source of direct current, such as supply circuit 2, is connected to motor 1.

The speed regulating means for motor 1 comprises a rotor element, consisting preferably of a salient pole rotor element 3 of magnetic material and non-magnetic filler elements 3', which is driven by motor 1 and which at a predetermined speed becomes locked to certain other elements, through the action of magnetic forces, by what may be referred to as a species of mechanical resonance. In the illustrated embodiment of our invention this means comprises a tuning fork 4, having magnetic pole pieces 5 which are attached to the tips of the prongs of the fork 4, and a source of magnetism, such as a pair of electromagnets 6, for producing a flow of flux between the pole pieces 5 through the rotor element 3. The magnets 6 may be energized from any suitable source and as shown they are connected to supply circuit 2. The poles of the magnet 6 are separated by short air gaps from the pole pieces 5, while the latter are connected to tuning fork 4 by means of suitable non-magnetic members, such as brass pieces 7. The purposes of these brass pieces 7 is to prevent a short circuit of the magnetic circuit by the tuning fork 4. The reason that two electromagnets are employed is that they thus equalize the lateral magnetic forces between the magnet poles and the vibrating pole pieces. Such equalization of otherwise unbalanced forces creates the most favorable condition for free vibration of the fork.

At this point it should be noticed that although we have shown and described separate electromagnets and tuning forks, our invention in its broader aspects merely requires the production of a magnetic circuit including a rotatable element which rotates at the speed of the device to be regulated and means cooperating with this rotating element which vibrates at a fixed and predetermined frequency. It is therefore immaterial to our invention, in its broader aspects, whether the tuned member which vibrates at a fixed frequency is also a magnet, either permanent or electromagnetic. If it is a magnet, a separate magnet would not be needed. If a separate magnet is employed, it is immaterial whether it is permanent or electromagnetic. Of course if the fork were a magnet there would be no reason for employing non-magnetic members 7 and consequently they would be omitted.

The operation of the embodiment of our invention illustrated in Fig. 1 is as follows: Assume that supply circuit 2 has just been energized, with the result that magnets 6 are energized and motor 1 is starting to rotate. As the poles of member 3 come into alignment with pole pieces 5 the air gap between these elements will of course be shortest and consequently the force tending to draw pole pieces 5 together will be greatest. Therefore as member 3 turns the pole pieces 5 will be subjected to periodic impulses or forces tending to pull them together as a result of the periodic changes in the reluctance of the magnetic circuit containing them. As the speed of the motor 1 increases, the rate of these impulses also increases until they approach in frequency the natural period of vibration or oscillation of the prongs of tuning fork 4. When this occurs the amplitude of the vibration or motion of pole pieces 5 will be considerably increased with the result that the rotor 3 tends to lock itself in at a speed corresponding to the natural period of vibration of the fork. Thus if the motor 1 tends to operate too fast, the poles of the member 3 will try to leave the vicinity of the pole pieces 5 while the pole pieces are still approaching the poles of the rotor, or in other words, while the force of attraction between the poles and the rotor is increasing, with the result that a counter force is produced tending to check the overspeed of motor 1. Likewise if motor 1 tends to run too slowly the poles of rotor 3 will be approaching the pole pieces when these pole pieces come closest to each other, that is to say when the air gaps are shortest, which also means that the force between the rotor and the pole pieces is the greatest. Thus a torque is produced which tends to increase the speed of the motor 1.

The purpose of filler members 3' is to prevent an air pumping action by the poles of member 3, which action would tend to neutralize the synchronizing forces produced by the device.

By varying the number of poles of member 3 or by providing tuning forks of different natural periods, it is possible to maintain practically any speed of rotation which is desired. Furthermore, if desired, a vibrating reed may be substituted for a tuning fork, that is to say, only one-half of the tuning fork may be used with the result that only one pole piece would also be used.

In the modification illustrated in Fig. 2, fixed pole pieces 8 are interposed between the rotor element and the vibratory pole pieces 5. By this construction the air gaps between the rotor and the pole pieces 8 can be very accurately and closely adjusted and a more careful adjustment of the fork amplitude may be made. The operation is the same as in Fig. 1 except that the variable air gap is between pole pieces 5 and 8 instead of between pole pieces 5 and the rotor.

As the speed reference or standard in our regulator is a vibratory element having a natural period, it will be seen that we have provided a regulator which is readily reproducible and which when applied to separate and distinct rotating units will cause them to operate in substantial synchronism.

While we have shown and described particular embodiments of our invention, it will be obvious to those skilled in the art that changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States, is,—

1. In combination, a flux carrying magnetic circuit, means for periodically changing the magnetic reluctance of said circuit at a rate which tends to vary, and means for periodically changing the magnetic reluctance of said circuit at a constant rate whereby the magnetic forces produced by said circuit tend to synchronize said first means with said second means.

2. A speed regulator having, in combination, a flux carrying magnetic circuit, including means for periodically changing the magnetic reluctance of said circuit at a rate which is proportional to the speed of a device to be regulated, other means for changing the reluctance of said magnetic circuit at a substantially constant rate, said two means being in series relation in said magnetic circuit whereby the magnetic forces produced by said circuit result in synchronizing forces tending to make the minimum reluctance portions of the periodic cycles of each of said means coincide in time when there is a tendency for them to diverge.

3. In combination, a magnetically salient pole rotating element of magnetic material, an element of magnetic material adapted to vibrate at a fixed frequency in a plane which is substantially normal to the axis of rotation of said first-mentioned element and a flux carrying magnetic circuit including both said elements.

4. In combination, a rotating element of magnetic material whose permeability is different on different radii, pole pieces on opposite sides of said element, means for causing said pole pieces to vibrate in the plane of rotation of said element at a fixed frequency and a flux carrying magnetic circuit including said pole pieces and said element.

5. In combination, a rotatable element having a magnetically non-circular cross section in its plane of rotation, a device with a natural period of vibration having a part thereof adapted to vibrate in the plane of rotation of said element and magnetic circuit having a unidirectional flux flow including said element and said part.

6. A speed regulator having, in combination, a pair of pole pieces, means for vibrating said pieces at a fixed rate in a path which includes them, a magnetically salient pole rotor between said pole pieces and means for producing a flux which threads said rotor and said pole pieces.

7. In combination, a rotating shaft, means for producing a torque on said shaft which opposes a change in its speed from a predetermined value comprising, a flux carrying magnetic circuit which includes an element which rotates at a speed proportional to the speed of said shaft and a movable member which oscillates at a frequency which is a multiple of the speed of said element.

8. In combination, a magnetically salient pole rotor, a pair of pole pieces cooperating with the poles of said rotor, a tuning fork, non-magnetic means for fastening said pole pieces to the respective prongs of said fork and a source of magnetism for causing a flow of flux between said pole pieces through said rotor.

9. In combination, a magnetically salient pole rotor, a pair of pole pieces cooperating with said rotor, means for causing said pole pieces to have a natural period of vibration in the plane of rotation of said rotor, and a magnet each of whose poles are adjacent to a different one of said pole pieces.

10. In a speed regulator, a tuning fork, the tips of whose prongs are composed of magnetic material, means for causing a flow of flux between said tips comprising a magnet between whose poles and said tips are relatively short air gaps, and a magnetically salient pole rotor for varying the magnetic reluctance between said tips.

11. In combination, a source of current supply, an electric motor connected to be energized from said source, a vibratory element having a sharp natural period of vibration and a flux carrying magnetic circuit including a portion of said element for producing directly timed impulses of magnetic force which oppose a change in speed of said motor from a value which corresponds to the period of vibration of said vibratory element.

12. In combination, a source of direct current supply, a direct current motor connected to be energized thereby, a magnetically salient pole rotor adapted to be driven by said motor, a pair of pole pieces cooperating with said rotor, a tuning fork, non-magnetic members joining said pole pieces to the respective prongs of said fork and electromagnetic means energized from said source of current supply for causing flux to flow from one of said pole pieces to the other through said rotor, said electromagnetic means being so arranged with respect to said pole pieces that the flux which enters and leaves the respective pole pieces produces no unbalanced forces on said pieces.

In witness whereof we have hereunto set our hands.

ALAN S. FITZ GERALD.
CHARLES J. YOUNG.